(12) United States Patent
Park et al.

(10) Patent No.: US 11,881,159 B2
(45) Date of Patent: Jan. 23, 2024

(54) DISPLAY DEVICE

(71) Applicant: Samsung Display Co., LTD., Yongin-si (KR)

(72) Inventors: Myunghoon Park, Suwon-si (KR); Dong-Hoon Lee, Hwaseong-si (KR); Kyunghoon Chung, Yongin-si (KR); Haemin Kim, Gumi-si (KR); Byungchang Yu, Seosan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/101,018

(22) Filed: Jan. 24, 2023

(65) Prior Publication Data

US 2023/0306898 A1 Sep. 28, 2023

(30) Foreign Application Priority Data

Mar. 24, 2022 (KR) ........................ 10-2022-0036883

(51) Int. Cl.
*G09G 3/32* (2016.01)

(52) U.S. Cl.
CPC ....... *G09G 3/32* (2013.01); *G09G 2310/0267* (2013.01); *G09G 2330/06* (2013.01)

(58) Field of Classification Search
CPC ............. G09G 3/32; G09G 2310/0267; G09G 2330/06; G09G 3/3225–3258
See application file for complete search history.

(56) References Cited

U.S. PATENT DOCUMENTS

| | | | | |
|---|---|---|---|---|
| 10,483,341 | B2 * | 11/2019 | Jung | G09G 3/20 |
| 10,937,854 | B2 * | 3/2021 | Chung | H10K 50/8426 |
| 2019/0096978 | A1 * | 3/2019 | Jung | G09G 3/3275 |
| 2019/0348491 | A1 * | 11/2019 | Chung | H10K 59/131 |
| 2021/0175321 | A1 * | 6/2021 | Chung | H10K 59/40 |

FOREIGN PATENT DOCUMENTS

| | | |
|---|---|---|
| KR | 10-2000738 | 7/2019 |

* cited by examiner

*Primary Examiner* — Michael Pervan
(74) *Attorney, Agent, or Firm* — Lewis Roca Rothgerber Christie LLP

(57) ABSTRACT

A display device includes: a plurality of gate lines in a display area and extending in a first direction; a scan driver in a non-display area surrounding the display area, connecting the gate lines, extending in a second direction crossing the first direction, and having a first length in the second direction; and an antistatic pattern in the non-display area, extending in the second direction, and having a second length greater than the first length in the second direction.

20 Claims, 14 Drawing Sheets

DISPLAY DEVICE

CROSS-REFERENCE TO RELATED APPLICATION

The present application claims priority to and the benefit of Korean Patent Application No. 10-2022-0036883, filed on Mar. 24, 2022, the entire content of which is incorporated herein by reference.

BACKGROUND

1. Field

Aspects of some embodiments according to the present disclosure relate generally to a display device.

2. Description of the Related Art

A display device is divided into a display area and a non-display area. A pixel is located in the display area, and a driver and a line for driving the pixel are located in the non-display area. When static electricity instantaneously generated in the process of manufacturing the display device is transferred through the substrate, insulating layers or transistors provided in the display device may be damaged.

The above information disclosed in this Background section is only for enhancement of understanding of the background and therefore the information discussed in this Background section does not necessarily constitute prior art.

SUMMARY

Aspects of some embodiments include a display device.

A display device according to some embodiments may include a plurality of gate lines in a display area and extending in a first direction, a scan driver in a non-display area surrounding the display area, connecting the gate lines, extending in a second direction crossing the first direction, and having a first length in the second direction, and an antistatic pattern in the non-display area, extending in the second direction, and having a second length greater than the first length in the second direction.

According to some embodiments, the scan driver may include a plurality of stages, the stages may be connected to the gate lines, respectively, each of the stages may have a third length in the second direction, and a difference between the second length and the first length may be greater than or equal to the third length.

According to some embodiments, the antistatic pattern may include a first portion overlapping the scan driver in the first direction and a second portion extending from the first portion in the second direction.

According to some embodiments, the second portion may not overlap the scan driver.

According to some embodiments, the antistatic pattern may further include a protrusion protruding from the first portion in the first direction.

According to some embodiments, the protrusion may be protruded toward the scan driver.

According to some embodiments, the protrusion may overlap the scan driver in the first direction.

According to some embodiments, the antistatic pattern may include a first lower pattern overlaps the scan driver in the first direction, a second lower pattern connected to the first lower pattern in the second direction, a first upper pattern on the first lower pattern and contacting the first lower pattern, and a second upper pattern connected to the first upper pattern in the second direction, on the second lower pattern, and contacting the second lower pattern.

According to some embodiments, the second lower pattern and the second upper pattern may not overlap the scan driver.

According to some embodiments, a width of the second lower pattern in the first direction may be equal to a width of the second upper pattern in the first direction.

According to some embodiments, the second lower pattern may include titanium and aluminum.

According to some embodiments, the antistatic pattern may include a first lower piece pattern overlapping the scan driver in the first direction, a second lower piece pattern separated from the first lower piece pattern in the second direction, a first upper pattern on the first lower piece pattern and contacting the first lower piece pattern, and a second upper pattern connected to the first upper pattern in the first upper pattern, on the second lower piece pattern, and contacting the second lower piece pattern.

According to some embodiments, the second lower piece pattern and the second upper pattern may not overlap the scan driver.

According to some embodiments, a width of the second lower piece pattern in the first direction may be equal to a width of the second upper pattern in the first direction.

According to some embodiments, the display device may further include a clock line between the scan driver and the antistatic pattern, connected to the scan driver, and extending in the second direction.

According to some embodiments, the display device may further include a scan driving line between the scan driver and the antistatic pattern, connected to the scan driver, and extending in the second direction.

According to some embodiments, the scan driving line may have a fourth length in the second direction, and the fourth length may be greater than the first length and smaller than the second length.

A display device according to some embodiments may include a plurality of gate lines in a display area and extending in a first direction, a scan driver in a non-display area surrounding the display area, connected to the gate lines, and extending in a second direction crossing the first direction, a plurality of lower piece patterns in the non-display area, extending in the second direction, and overlapping the scan driver in the first direction, and an upper pattern on the lower piece patterns and contacting the lower piece patterns.

According to some embodiments, the scan driver may include a plurality of stages, the stages may be connected to the gate lines, respectively, each of the stages may have a third length in the second direction, and a fifth length of each of the lower piece patterns in the second direction may be smaller than the third length of each of the stages.

According to some embodiments, a width of each of the lower piece patterns in the first direction may be equal to a width of the upper pattern in the first direction.

Therefore, a display device according to some embodiments of the present invention may include an antistatic pattern. The antistatic pattern may include a plurality of first lower piece patterns and a plurality of second lower piece patterns. In addition, the antistatic pattern may include a first portion overlapping the scan driver and a second portion extending not to overlap the scan driver.

As the first lower piece patterns and the second lower piece patterns are separated from each other, static electricity applied to one lower piece pattern may be dispersed. In addition, as the antistatic pattern includes the second portion, static electricity applied to the antistatic pattern may be dispersed to the second portion. Accordingly, static electricity may not be concentrated on the protrusion, and dielectric breakdown occurring in the protrusion may be prevented or reduced.

BRIEF DESCRIPTION OF THE DRAWINGS

The accompanying drawings, which are included to provide a further understanding of the inventive concept and are incorporated in and constitute a part of this specification, illustrate embodiments of the inventive concept together with the description.

DETAILED DESCRIPTION

Illustrative, non-limiting embodiments will be more clearly understood from the following detailed description in conjunction with the accompanying drawings.

Figure 1:
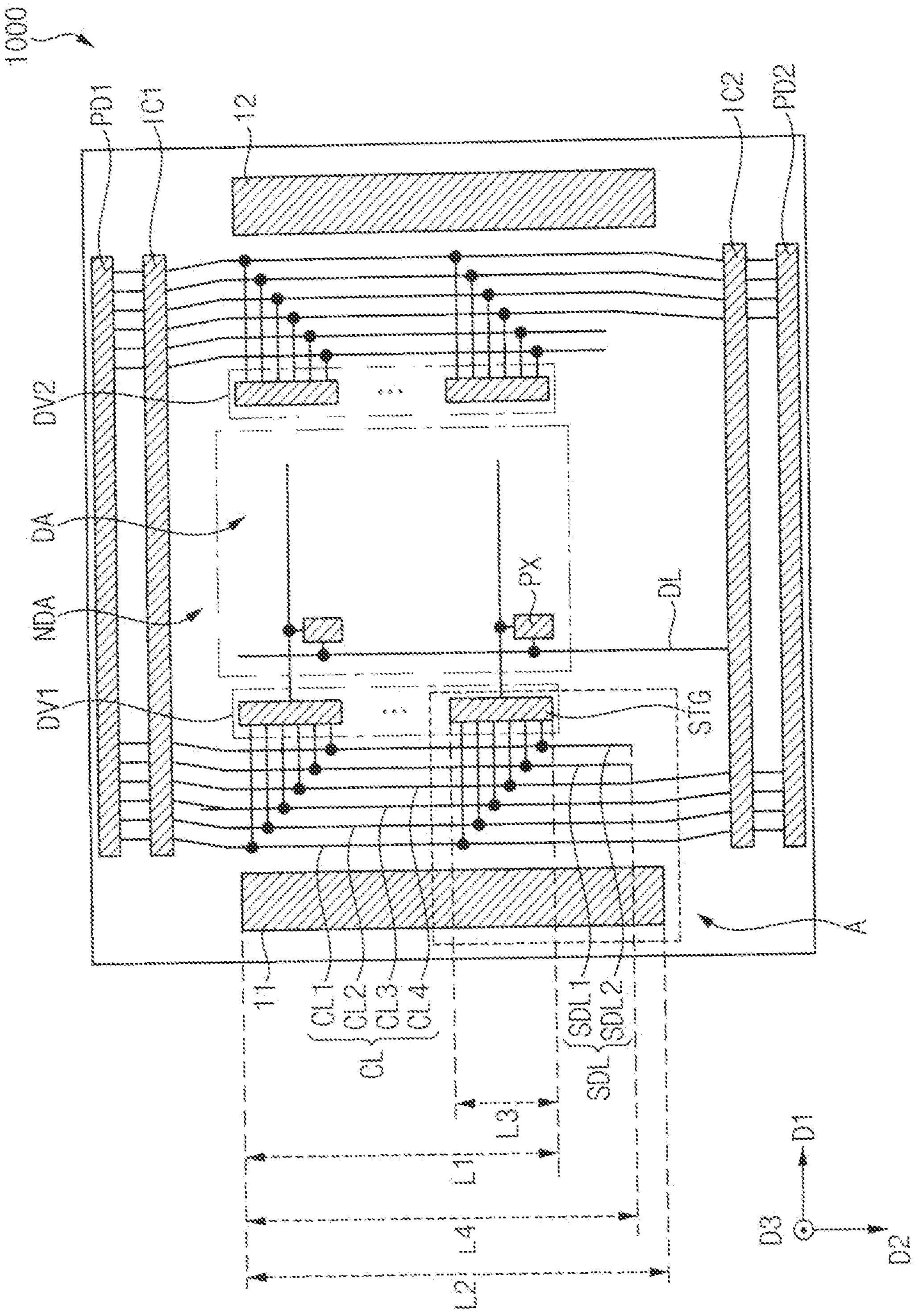
FIG. 1 is a plan view illustrating a display device according to some embodiments of the present invention.

FIG. 1 is a plan view illustrating a display device according to some embodiments of the present invention.

Referring to FIG. 1, a display device 1000 according to some embodiments of the present invention may be divided into a display area DA and a non-display area NDA. The display area DA may have a set or predetermined shape, and the non-display area NDA may surround the display area DA.

According to some embodiments, a gate line GL, a data line DL, and a pixel PX may be located in the display area DA.

The gate line GL may extend in a first direction D1. The gate line GL may be connected to a scan driver and the pixels PX. The gate line GL may transmit a scan signal to the pixels PX.

The data line DL may extend in a second direction D2 crossing the first direction D1. The data line DL may be connected to a data driver and the pixel PX. The data line DL may transmit a data voltage to the pixel PX.

The pixel PX may be connected to the gate line GL and the data line DL. The pixel PX may emit light corresponding to the data voltage in response to the scan signal.

A first pad part PD1, a first data driver IC1, a second pad part PD2, a second data driver IC2, a first scan driver DV1, and a second scan driver DV2, a clock line CL, a scan driving line SDL, a first antistatic pattern 11, and a second antistatic pattern 12 may be located in the non-display area NDA.

According to some embodiments, the first scan driver DV1 may include a plurality of stages STG, and the second scan driver DV2 may have substantially the same structure as the first scan driver DV1.

According to some embodiments, the clock line CL may include a first clock line CL1, a second clock line CL2, a third clock line CL3, and a fourth clock line CL4.

According to some embodiments, the scan driving line SDL may include a first scan driving line SDL1 and a second scan driving line SDL2.

According to some embodiments, the first pad part PD1 may be located at an upper end of the display device 1000. For example, the first pad part PD1 may be adjacent to an upper end of the display area DA. The first pad part PD1 may provide a clock signal, a scan driving voltage, the data voltage, and the like.

According to some embodiments, the first data driver IC1 may be located at an upper end of the display device 1000. For example, the first data driver IC1 may be located between the display area DA and the first pad part PD1. The first data driver IC1 may be connected to the first pad part PD1. The first data driver IC1 may transmit the clock signal, the scan driving voltage, the data voltage, and the like.

According to some embodiments, the second pad part PD2 may be located at a lower end of the display device 1000. For example, the second pad part PD2 may be adjacent to a lower end of the display area DA. The second pad part PD2 may provide the clock signal, the data voltage, and the like.

According to some embodiments, the second data driver IC2 may be located at a lower end of the display device 1000. For example, the second data driver IC2 may be located between the display area DA and the second pad part PD2. The second data driver IC2 may be connected to the second pad part PD2. The second data driver IC2 may transmit the clock signal, the data voltage, and the like.

According to some embodiments, the display device 1000 may include the first data driver IC1 and the second data driver IC2. The first data driver IC1 and the second data driver IC2 may face each other with the display area DA interposed therebetween.

According to some embodiments, the first scan driver DV1 may be located at a left end of the display device 1000. For example, the first scan driver DV1 may be adjacent to a left end of the display area DA.

The first scan driver DV1 may extend in the second direction D2 and may have a first length L1 in the second direction D2.

The first scan driver DV1 may include a plurality of stages STG. For example, each of the stages STG may extend in the second direction D2 and may be arranged side by side in the second direction D2. In addition, each of the stages STG may have a third length L3 in the second direction D2.

The stage STG may be connected to the first to fourth clock lines CL1, CL2, CL3, and CL4. In addition, the stage STG may be connected to the first scan driving line SDL1 and the second scan driving line SDL2, and may be connected to one of the gate lines GL. The stage STG may generate the scan signal based on the clock signal and the scan driving voltage.

According to some embodiments, the second scan driver DV2 may be located at a right end of the display device 1000. For example, the second scan driver DV2 may be adjacent to a right end of the display area DA.

According to some embodiments, each of the first clock line CL1, the second clock line CL2, the third clock line CL3, and the fourth clock line CL4 may be located on a left side of the first scan driver DV1. For example, the first scan driver DV1 may be located between the clock line CL and the display area DA.

The first to fourth clock lines CL1, CL2, CL3, and CL4 may be arranged side by side in the first direction D1 and may extend in the second direction D2.

Each of the first to fourth clock lines CL1, CL2, CL3, and CL4 may transmit the clock signal for generating the scan signal.

In addition, at least one clock line may be further located on a right side of the second scan driver DV2. For example, the second scan driver DV2 may be located between a clock line located on the right side and the display area DA.

According to some embodiments, each of the first scan driving line SDL1 and the second scan driving line SDL2 may be located on a left side of the first scan driver DV1. For example, the first scan driving line SDL1 and the second scan driving line SDL2 may be located between the clock line CL and the first scan driver DV1.

The first and second scan driving lines SDL1 and SDL2 may be arranged side by side in the first direction D1 and may extend in the second direction D2. In addition, each of the first and second scan driving lines SDL1 and SDL2 may have a fourth length L4 in the second direction D2.

The first and second scan driving lines SDL1 and SDL2 may transmit the scan driving voltage for generating the scan signal.

In addition, at least one scan driving line may be further located on the right side of the second scan driver DV2. For example, the second scan driver DV2 may be located between the scan driving line located on the right side and the display area DA.

According to some embodiments, the first antistatic pattern 11 may be located at a left end of the display device 1000. For example, the clock line CL may be located between the first antistatic pattern 11 and the scan driving line SDL.

The first antistatic pattern 11 may extend in the second direction D2 and have a second length L2 in the second direction D2. According to some embodiments, the second length L2 may be greater than the first length L1. For example, the first antistatic pattern 11 may extend further in the second direction D2 than the first scan driver DV1.

According to some embodiments, the second antistatic pattern 12 may be located at a right end of the display device 1000. The second antistatic pattern 12 may have substantially the same structure as the first antistatic pattern 11.

Figure 2:
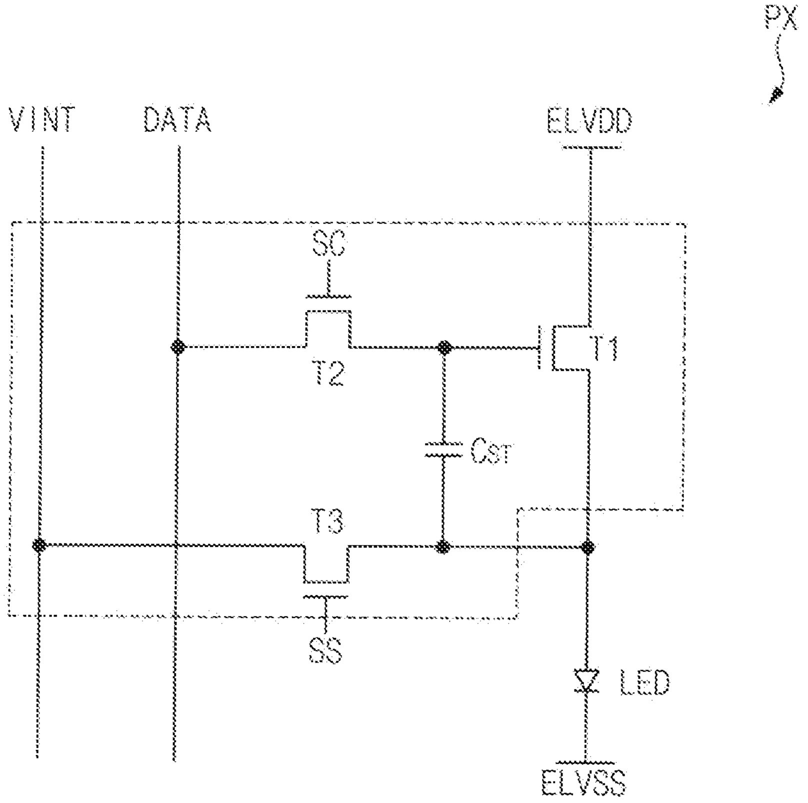
FIG. 2 is a circuit diagram illustrating a pixel included in the display device of FIG. 1.
Figure 3:
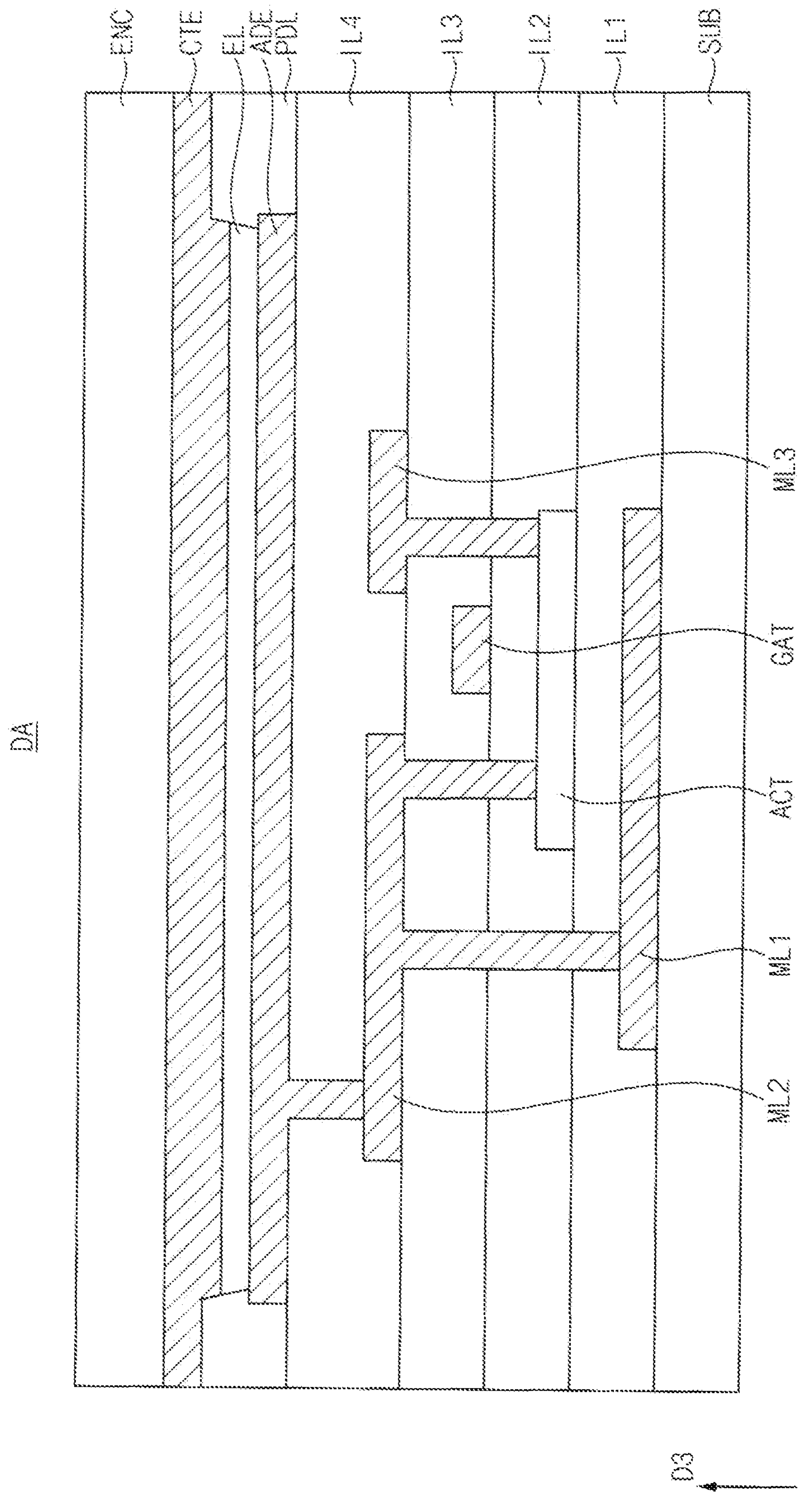
FIG. 3 is a cross-sectional view illustrating the display device of FIG. 1.

FIG. 2 is a circuit diagram illustrating a pixel included in the display device of FIG. 1. FIG. 3 is a cross-sectional view illustrating the display device of FIG. 1.

Referring to FIG. 2, the pixel PX may include a first transistor T1, a second transistor T2, a third transistor T3, a storage capacitor CST, and a light emitting diode LED.

The first transistor T1 may include a first terminal, a second terminal, and a gate terminal. The first terminal may receive a first voltage ELVDD. The second terminal may be connected to the light emitting diode LED. The gate terminal may be connected to the second transistor T2. The first transistor T1 may generate a driving current based on the first voltage ELVDD and the data voltage DATA.

The second transistor T2 may include a first terminal, a second terminal, and a gate terminal. The first terminal may receive the data voltage DATA. The second terminal may be connected to the first transistor T1. The gate terminal may receive the first scan signal SC. The second transistor T2 may transmit the data voltage DATA in response to the first scan signal SC.

The third transistor T3 may include a first terminal, a second terminal, and a gate terminal. The first terminal may be connected to the first transistor T1. The second terminal may receive an initialization voltage VINT. The gate terminal may receive the second scan signal SS. The third transistor T3 may transmit the initialization voltage VINT in response to the second scan signal SS.

The storage capacitor CST may include a first terminal and a second terminal. The first terminal may be connected to the gate terminal of the first transistor T1. The second terminal may be connected to the first terminal of the third transistor T3. The storage capacitor CST may maintain the voltage level of the gate terminal of the first transistor T1 during the inactivation period of the first scan signal SC.

The light emitting diode LED may include a first terminal and a second terminal. The first terminal may be connected to the second terminal of the first transistor T1. The second terminal may receive a second voltage ELVSS. The light emitting diode LED may emit light having a luminance corresponding to the driving current. The light emitting diode LED may include an organic light emitting diode using an organic material as an emission layer, an inorganic light emitting diode using an inorganic material as an emission layer, and the like.

Referring to FIG. 3, the display device 1000 may include a substrate SUB, a lower conductive pattern ML1, a first insulating layer IL1, an active pattern ACT, a second insulating layer IL2, a gate electrode GAT, a third insulating layer IL3, a first upper conductive pattern ML2, a second upper conductive pattern ML3, a fourth insulating layer IL4, a first electrode ADE, a pixel defining layer PDL, an emission layer EL, a second electrode CTE, and an encapsulation layer ENC.

The substrate SUB may include a transparent or opaque material. Examples of the material that can be used as the substrate SUB may include glass, quartz, plastic, or the like. These may be used alone or in combination with each other.

The lower conductive pattern ML1 may be located on the substrate SUB. According to some embodiments, the lower conductive pattern ML1 may be formed of a metal, an alloy, a conductive metal oxide, a transparent conductive material, or the like. Examples of materials that can be used as the lower conductive pattern ML1 may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like. These may be used alone or in combination with each other. For example, the lower conductive pattern ML1 may include titanium and aluminum. In addition, the lower conductive pattern ML1 may be formed of a single layer or a multilayer.

The first insulating layer IL1 may be located on the lower conductive pattern ML1. According to some embodiments, the first insulating layer IL1 may be formed of an insulating material. Examples of the insulating material that can be used as the first insulating layer IL1 may include silicon oxide, silicon nitride, silicon oxynitride, and the like. These may be used alone or in combination with each other. In addition, the first insulating layer IL1 may be formed of a single layer or a multilayer.

The active pattern ACT may be located on the first insulating layer IL1. According to some embodiments, the active pattern ACT may be formed of a silicon semiconductor material or an oxide semiconductor material. Examples of the silicon semiconductor material that may be used as the active pattern ACT may include amorphous silicon, polycrystalline silicon, or the like. Examples of the oxide semiconductor material that may be used as the active pattern ACT may include IGZO (InGaZnO) and ITZO (InSnZnO). In addition, the oxide semiconductor material may further include indium (In), gallium (Ga), tin (Sn), zirconium (Zr), vanadium (V), hafnium (Hf), cadmium (Cd), germanium (Ge), chromium (Cr)), titanium (Ti), and zinc (Zn). These may be used alone or in combination with each other.

The second insulating layer IL2 may be located on the active pattern ACT. According to some embodiments, the second insulating layer IL2 may be formed of an insulating material. Examples of the insulating material that can be used as the second insulating layer IL2 may include silicon oxide, silicon nitride, silicon oxynitride, and the like. These may be used alone or in combination with each other. In addition, the second insulating layer IL2 may be formed of a single layer or a multilayer.

The gate electrode GAT may be located on the second insulating layer IL2. According to some embodiments, the gate electrode GAT may be formed of a metal, an alloy, a conductive metal oxide, a transparent conductive material, or the like. Examples of the material that can be used as the gate electrode GAT may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like. These may be used alone or in combination with each other. In addition, the gate electrode GAT may be formed of a single layer or a multilayer.

According to some embodiments, the gate electrode GAT may correspond to a portion of the gate line GL. For example, the scan signal may be transmitted to the gate electrode GAT.

The third insulating layer IL3 may be located on the gate electrode GAT. According to some embodiments, the third insulating layer IL3 may be formed of an insulating material. Examples of the insulating material that can be used as the third insulating layer IL3 may include silicon oxide, silicon nitride, silicon oxynitride, and the like. These may be used alone or in combination with each other. In addition, the third insulating layer IL3 may be formed of a single layer or a multilayer.

The first upper conductive pattern ML2 and the second upper conductive pattern ML3 may be located on the third insulating layer IL3. The first upper conductive pattern ML2 and the second upper conductive pattern ML3 may be formed together and may include the same material.

According to some embodiments, the first upper conductive pattern ML2 and the second upper conductive pattern ML3 may be formed of a metal, an alloy, a conductive metal oxide, a transparent conductive material, or the like. Examples of materials that may be used as the first upper conductive pattern ML2 and the second upper conductive pattern ML3 may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like. These may be used alone or in combination with each other. In addition, the first upper conductive pattern ML2 and the second upper conductive pattern ML3 may be formed of a single layer or a multilayer structure.

The first upper conductive pattern ML2 may contact the first lower conductive pattern ML1 and the active pattern ACT. The second upper conductive pattern ML3 may contact the active pattern ACT.

The fourth insulating layer IL4 may be located on the first and second upper conductive patterns ML2 and ML3. According to some embodiments, the fourth insulating layer IL4 may be formed of an organic insulating material and/or an inorganic insulating material. Examples of the organic insulating material that can be used as the fourth insulating layer IL4 may include photoresist, polyacrylic resin, polyimide resin, acrylic resin, and the like. Examples of the inorganic insulating material that can be used as the fourth insulating layer IL4 may include silicon oxide, silicon nitride, silicon oxynitride, and the like. These may be used alone or in combination with each other. In addition, the fourth insulating layer IL4 may be formed of a single layer or a multilayer.

The first electrode ADE may be located on the fourth insulating layer IL4. According to some embodiments, the first electrode ADE may be formed of a metal, an alloy, a conductive metal oxide, a transparent conductive material, or the like. Examples of materials that can be used as the first electrode ADE may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), and the like. These may be used alone or in combination with each other. In addition, the first electrode ADE may be formed of a single layer or a multilayer.

The pixel defining layer PDL may be located on the fourth insulating layer IL4. An opening exposing the first electrode ADE may be formed in the pixel defining layer PDL.

The emission layer EL may be located in the opening on the first electrode ADE. The emission layer EL may emit light in response to the driving current.

The second electrode CTE may be located on the emission layer EL.

The encapsulation layer ENC may be located on the second electrode CTE. The encapsulation layer ENC may include at least one inorganic layer and at least one organic layer, and may prevent or reduce penetration of air and/or moisture.

Figure 4:
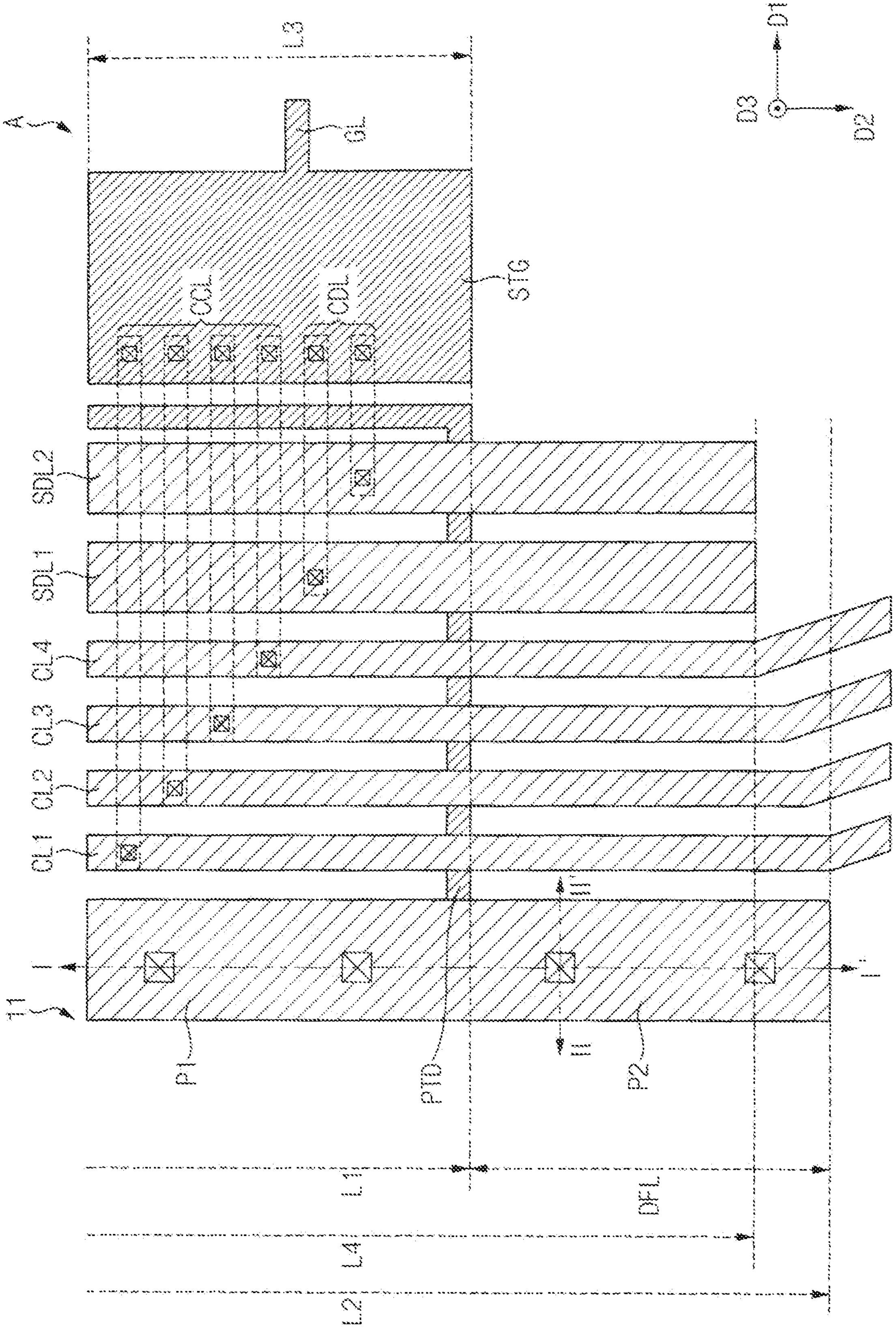
FIG. 4 is an enlarged view of area A of FIG. 1.
Figure 5:
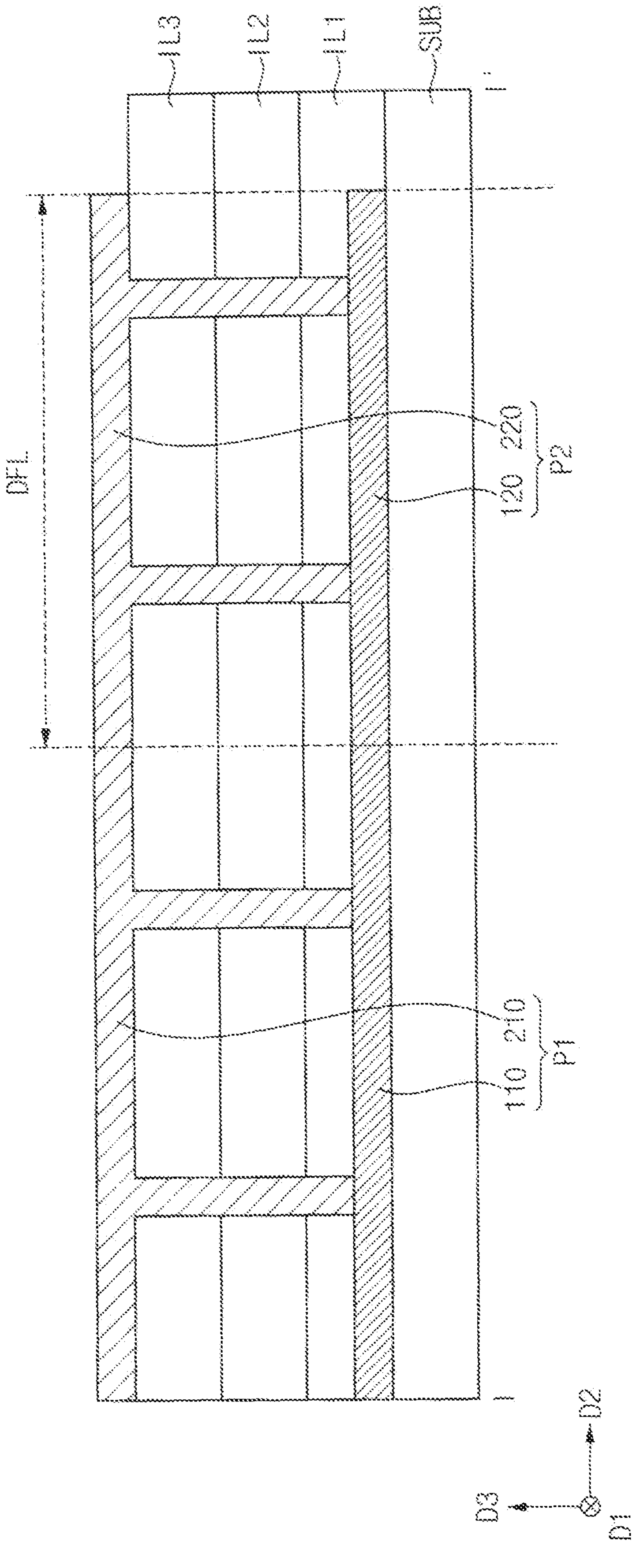
FIG. 5 is a cross-sectional view taken along the line I-I' of FIG. 4.
Figure 6:
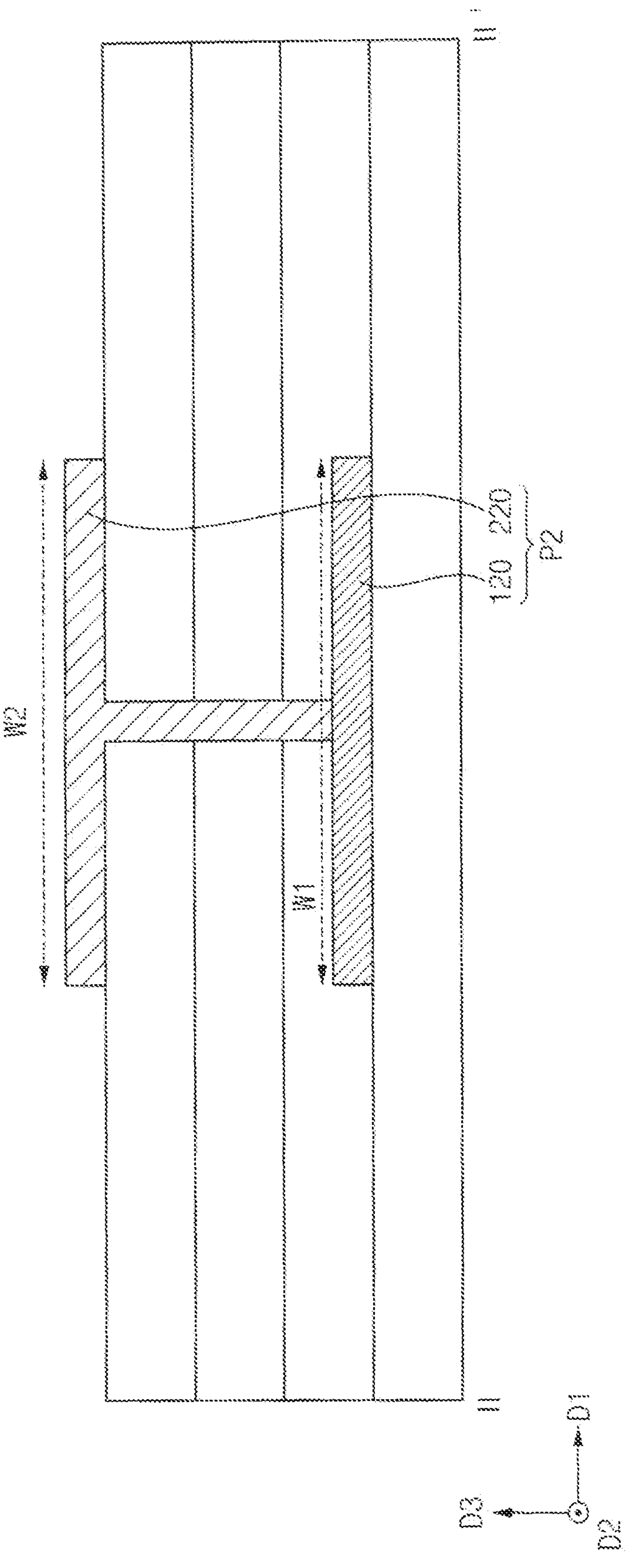
FIG. 6 is a cross-sectional view taken along the line II-II' of FIG. 4.

FIG. 4 is an enlarged view of area A of FIG. 1. FIG. 5 is a cross-sectional view taken along line I-I' of FIG. 4. FIG. 6 is a cross-sectional view taken along line II-II' of FIG. 4.

Referring to FIGS. 1 and 4, the first antistatic pattern 11 may include a first portion P1, a second portion P2, and a protrusion PTD.

The first portion P1 may extend in the second direction D2 and may overlap the first scan driver DV1 in the first direction D1. The protrusion PTD may protrude from the first portion P1 toward the first scan driver DV1 in the first direction D1. The protrusion PTD may overlap the first scan driver DV1 in the first direction D1.

The second portion P2 may extend from the first portion P1 in the second direction D2. The second portion P2 may not overlap the first scan driver DV1 in the first direction D1.

According to some embodiments, the second length L2 and the first length L1 may be different by a length difference DFL. In other words, the second portion P2 may have a length equal to the length difference DFL in the second direction D2.

According to some embodiments, the length difference DFL may be greater than or equal to the third length L3. For example, a difference between the second length L2 and the first length L1 may be greater than or equal to the third length L3. In other words, the second portion P2 may have a length greater than or equal to a length of the stage STG.

Referring to FIGS. 4, 5, and 6, the first portion P1 may include a first lower pattern 110 and a first upper pattern 210, and the second portion P2 may include a second lower pattern 120 and a second upper pattern 220.

According to some embodiments, the first lower pattern 110 may extend in the second direction D2. The first lower pattern 110 may be formed together with the lower conductive pattern ML1 and may include the same material as the lower conductive pattern ML1. For example, the first lower pattern 110 may include titanium and aluminum.

The protrusion PTD may protrude from the first lower pattern 110 in the first direction D1. The protrusion PTD may be formed together with the first lower pattern 110 and may include the same material as the first lower pattern 110.

The first upper pattern 210 may extend in the second direction D2. As shown in FIG. 5, the first upper pattern 210 may contact the first lower pattern 110 through at least one contact hole. The first upper pattern 210 may be formed together with the first and second upper conductive patterns ML2 and ML3 and may include the same material as the first and second upper conductive patterns ML2 and ML3.

According to some embodiments, the second lower pattern 120 may extend in the second direction D2. The second lower pattern 120 may be formed together with the first lower pattern 110 and may include the same material as the first lower pattern 110. For example, the second lower pattern 120 may include titanium and aluminum.

According to some embodiments, the second lower pattern 120 may be connected to the first lower pattern 110 in the second direction D2. For example, the second lower pattern 120 may be integrally formed with the first lower pattern 110. In addition, the second lower pattern 120 may have a length corresponding to the length difference DFL in the second direction D2.

According to some embodiments, the second lower pattern 120 may not overlap the first scan driver DV1.

According to some embodiments, the second upper pattern 220 may extend in the second direction D2 and may not overlap the first scan driver DV1. In addition, as shown in FIG. 5, the second upper pattern 220 may contact the second lower pattern 120 through at least one contact hole. The second upper pattern 220 may be formed together with the first upper pattern 210 and include the same material as the first upper pattern 210.

According to some embodiments, the second upper pattern 220 may be connected to the first upper pattern 210 in the second direction D2. For example, the second upper pattern 220 may be integrally formed with the first upper pattern 210. Also, the second upper pattern 220 may have a length equal to the length difference DFL in the second direction D2.

According to some embodiments, the second upper pattern 220 may not overlap the first scan driver DV1.

As shown in FIG. 6, according to some embodiments, a first width W1 of the second lower pattern 120 in the first direction D1 may be substantially equal to a second width W2 of the second upper pattern 220 in the first direction D1. In addition, the second lower pattern 120 may completely overlap the second upper pattern 220.

As shown in FIG. 4, the stage STG may be connected to the first to fourth clock lines CL1, CL2, CL3, and CL4 through a plurality of clock connection lines CCL. In addition, the stage STG may be connected to the first and second scan driving lines SDL1 and SDL2 through a plurality of driving connection lines CDL.

The display device 1000 may include the first antistatic pattern 11. The first antistatic pattern 11 may include a first portion P1 overlapping the first scan driver DV1 and a protrusion PTD. In addition, the first antistatic pattern 11 may include the second portion P2 extending in the second direction D2 so as not to overlap the first scan driver DV1.

As the first antistatic pattern 11 includes the protrusion PTD and the second portion P2, static electricity applied to the first antistatic pattern 11 may be dispersed into the protrusion PTD and the second portion P2. Accordingly, static electricity may not be concentrated to the protrusion PTD, and a dielectric breakdown phenomenon occurring in the protrusion PTD may be prevented or reduced.

Figure 7:
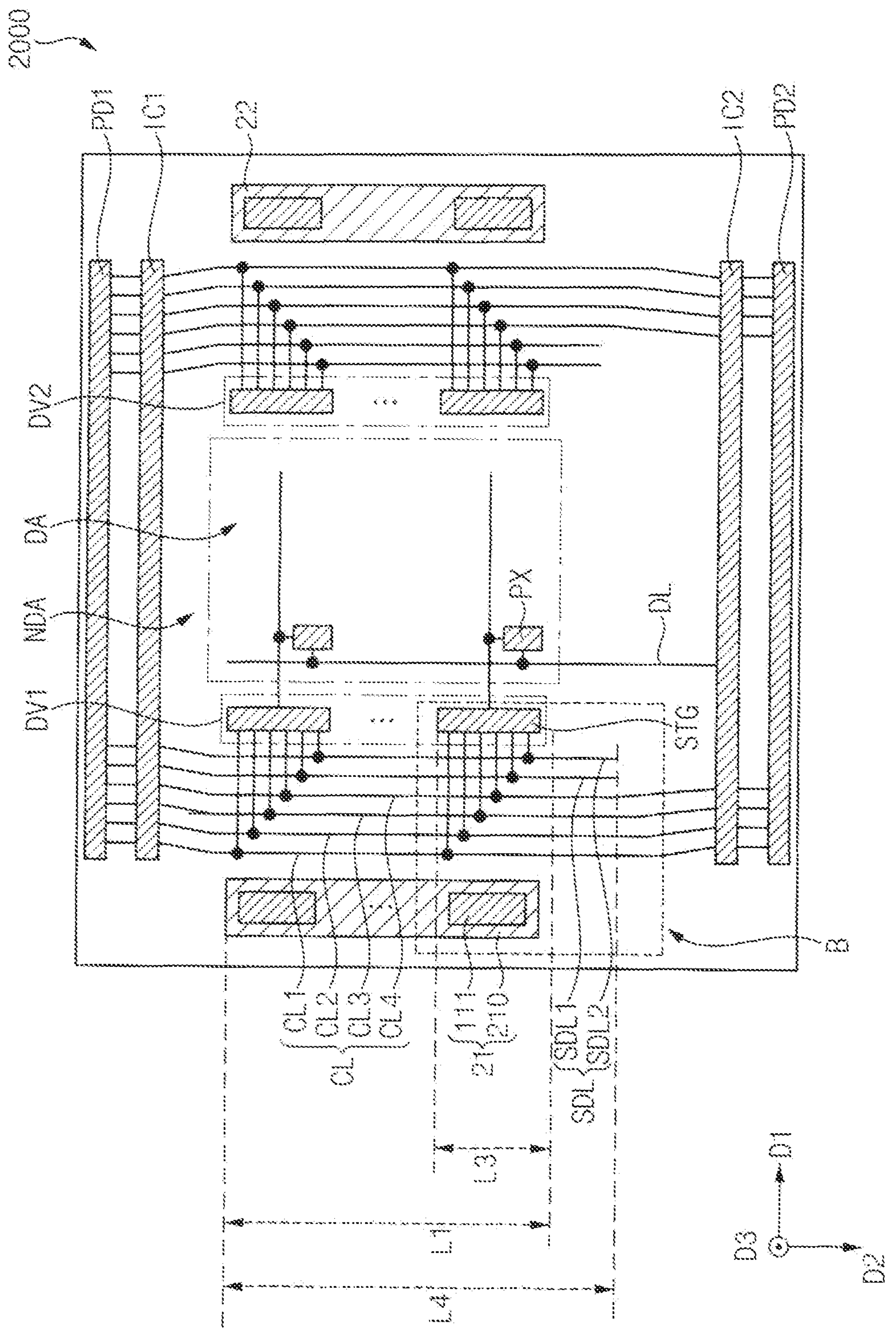
FIG. 7 is a plan view illustrating a display device according to some embodiments of the present invention.

FIG. 7 is a plan view illustrating a display device according to some embodiments of the present invention.

Referring to FIG. 7, a display device 2000 according to some embodiments may be divided into a display area DA and a non-display area NDA. The display area DA may have a set or predetermined shape, and the non-display area NDA may surround (e.g., located in a periphery of) the display area DA.

A gate line GL, a data line DL, and a pixel PX may be located in the display area DA.

However, the gate line GL, the data line DL, and the pixel PX may be substantially the same as the gate line GL, the data line DL, and the pixel PX described with reference to FIG. 1.

A first pad part PD1, a first data driver IC1, a second pad part PD2, a second data driver IC2, a first scan driver DV1, a second scan driver DV2, a clock line CL, a scan driving line SDL, a first antistatic pattern 21, and a second antistatic pattern 22 may be located in the non-display area NDA.

However, the first pad part PD1, the first data driver IC1, the second pad part PD2, the second data driver IC2, the first scan driver DV1, the second scan driver DV2, the clock line CL, and the scan driving line SDL may be substantially the same as the first pad part PD1, the first data driver IC1, the second pad part PD2, the second data driver IC2, the first scan driver DV1, the second scan driver DV2, the clock line CL, and the scan driving line SDL described with reference to FIG. 1.

According to some embodiments, the first antistatic pattern 21 may be located at a left end of the display device 2000. For example, the clock line CL may be located between the first antistatic pattern 21 and the scan driving line SDL.

The first antistatic pattern 21 may extend in the second direction D2 and have the first length L1 in the second direction D2. For example, the first antistatic pattern 21 may have the same length as a length of the first scan driver DV1.

According to some embodiments, the second antistatic pattern 22 may be located at a right end of the display device 2000. The second antistatic pattern 22 may have substantially the same structure as the first antistatic pattern 21.

Figure 8:
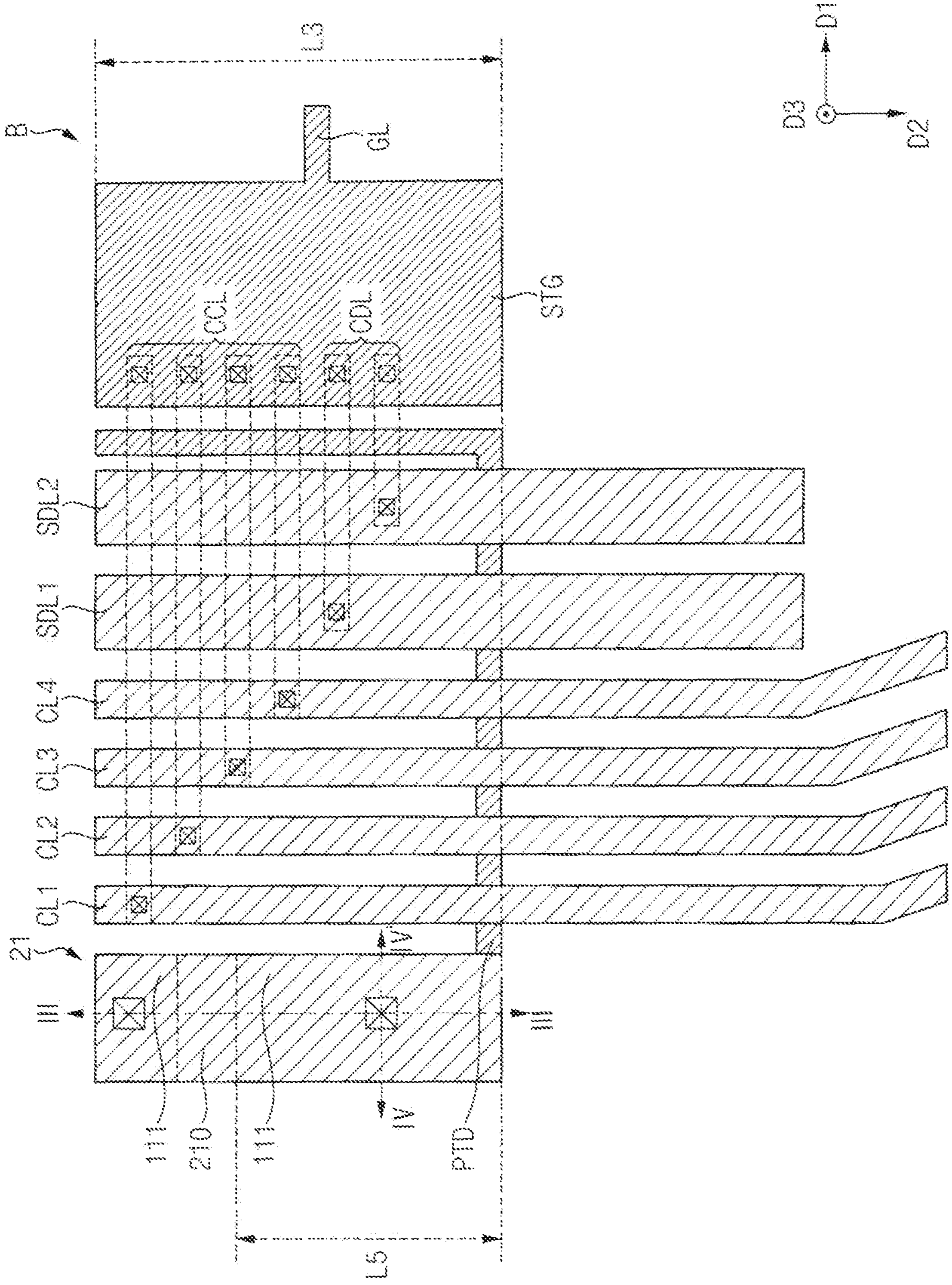
FIG. 8 is an enlarged view of area B of FIG. 7.
Figure 9:
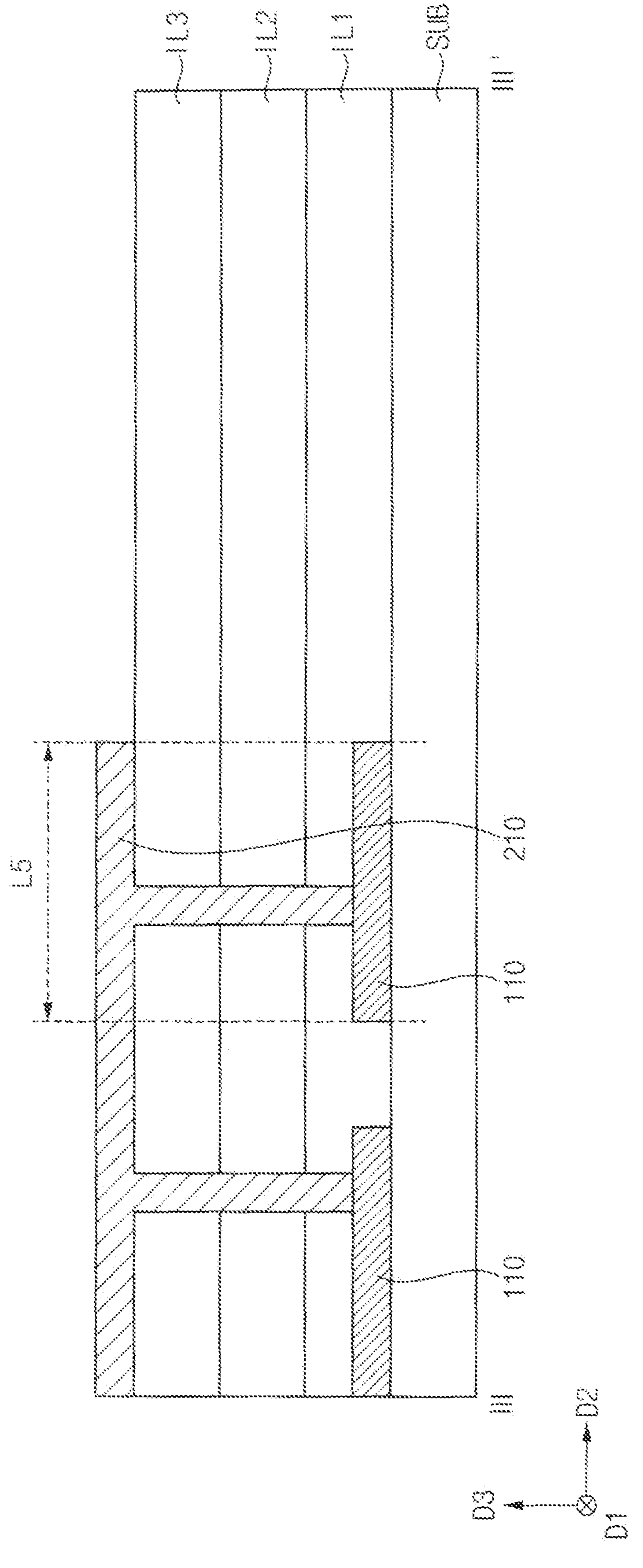
FIG. 9 is a cross-sectional view taken along the line III-III' of FIG. 8.
Figure 10:
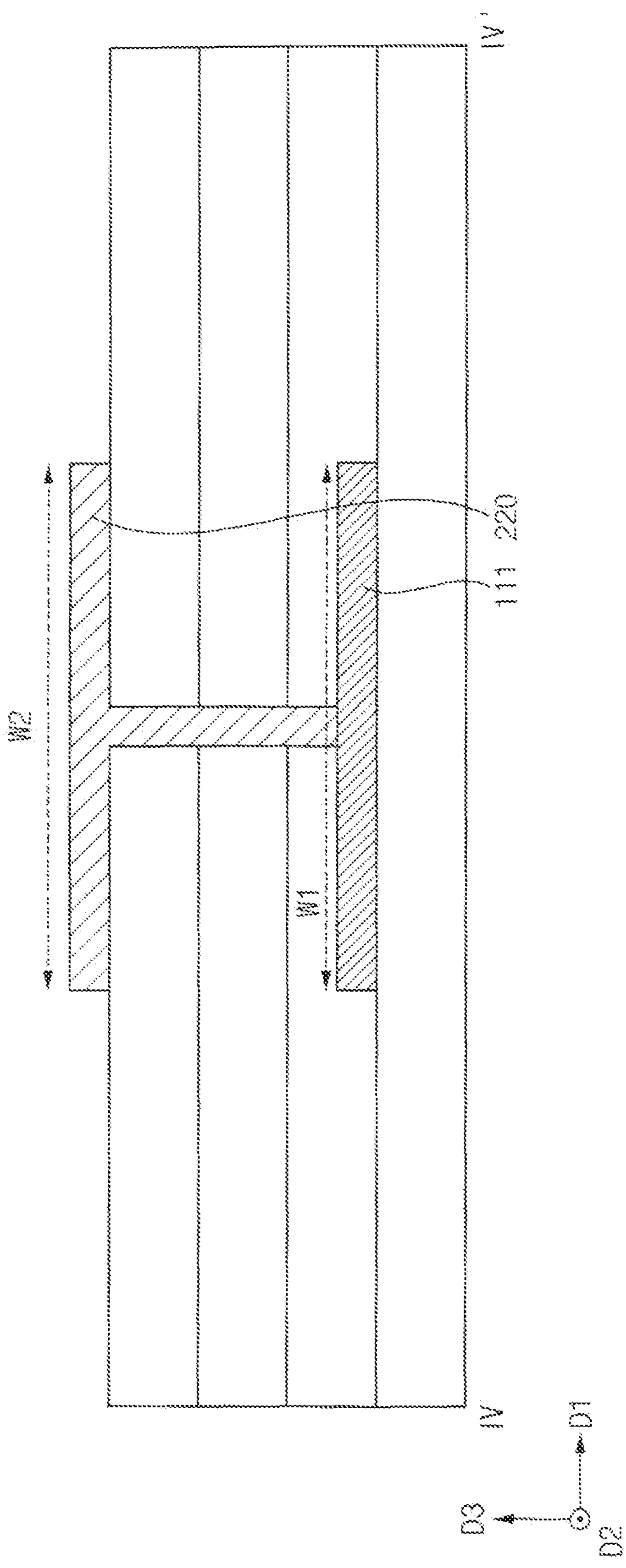
FIG. 10 is a cross-sectional view taken along the line IV-IV' of FIG. 8.

FIG. 8 is an enlarged view of area B of FIG. 7. FIG. 9 is a cross-sectional view taken along line III-III' of FIG. 8. FIG. 10 is a cross-sectional view taken along line IV-IV' of FIG. 8.

Referring to FIGS. 7 and 8, the first antistatic pattern 21 may include a plurality of lower piece patterns 111, an upper pattern 210, and a protrusion PTD.

According to some embodiments, each of the lower piece patterns 111 may extend in the second direction D2 and may overlap the first scan driver DV1 in the first direction D1. In addition, the lower piece patterns 111 may be arranged side by side in the second direction D2.

The protrusion PTD may protrude from any one of the lower piece patterns 111 in the first direction D1. The protrusion PTD may be formed together with the lower piece patterns 111 and may include the same material as the lower piece patterns 111.

The upper pattern 210 may extend in the second direction D2 and may overlap the first scan driver DV1 in the first direction D1. The upper pattern 210 may be located on the lower piece patterns 111 and may contact the lower piece patterns 111.

Referring to FIGS. 8, 9, and 10, each of the lower piece patterns 111 may have a fifth length L5 in the second direction D2. According to some embodiments, the fifth length L5 may be smaller than the third length L3 of the stage STG.

According to some embodiments, the lower piece patterns 111 may be formed together with the lower conductive pattern ML1 and may include the same material as the lower conductive pattern ML1. For example, the lower piece patterns 111 may include titanium and aluminum.

According to some embodiments, the upper pattern 210 may contact the lower piece patterns 111 through at least one contact hole. The upper pattern 210 may be formed together with the first and second upper conductive patterns ML2 and ML3 and may include the same material as the first and second upper conductive patterns ML2 and ML3.

As shown in FIG. 10, according to some embodiments, a first width W1 of the lower piece pattern 111 in the first direction D1 may be substantially equal to a second width W2 of the first upper pattern 210 in the first direction D1.

The display device 2000 may include the first antistatic pattern 21. The first antistatic pattern 21 may include a plurality of the lower piece patterns 111 and an upper pattern 210 located on the lower piece patterns 111.

As the lower piece patterns 111 are separated from each other, static electricity applied to one lower piece pattern may be dispersed. Accordingly, static electricity may not be concentrated to the protrusion PTD, and a dielectric breakdown phenomenon occurring in the protrusion PTD may be prevented or reduced.

Figure 11:
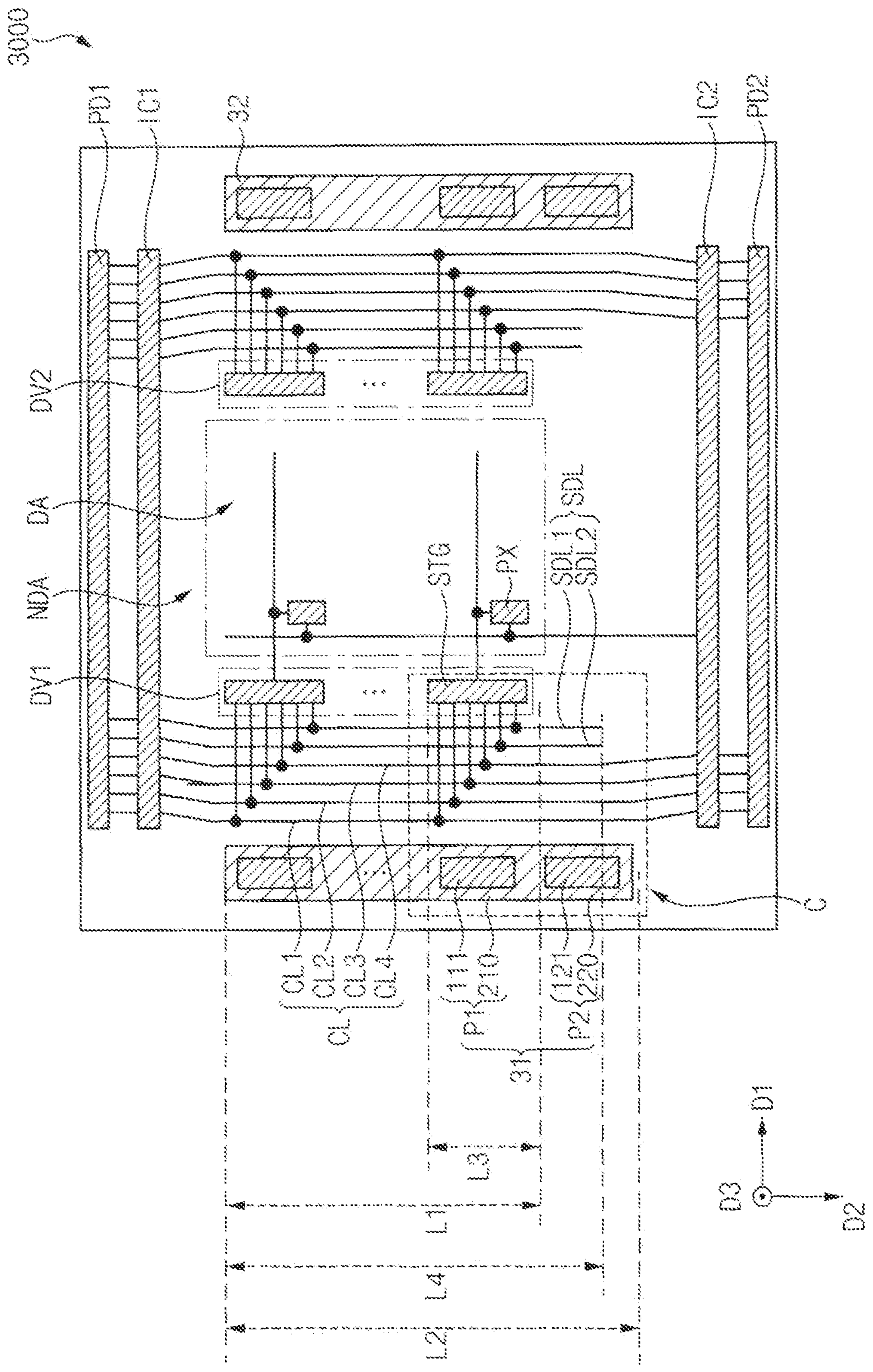
FIG. 11 is a plan view illustrating a display device according to some embodiments of the present invention.

FIG. 11 is a plan view illustrating a display device according to some embodiments of the present invention.

Referring to FIG. 11, a display device 3000 according to some embodiments may be divided into a display area DA and a non-display area NDA. The display area DA may have a set or predetermined shape, and the non-display area NDA may surround (e.g., located in a periphery of) the display area DA.

However, the gate line GL, the data line DL, and the pixel PX may be substantially the same as the gate line GL, the data line DL, and the pixel PX described with reference to FIG. 1.

A first pad part PD1, a first data driver IC1, a second pad part PD2, a second data driver IC2, a first scan driver DV1, a second scan driver DV2, a clock line CL, a scan driving line SDL, a first antistatic pattern 31, and a second antistatic pattern 32 may be located in the non-display area NDA.

However, the first pad part PD1, the first data driver IC1, the second pad part PD2, the second data driver IC2, the first scan driver DV1, the second scan driver DV2, the clock line CL, and the scan driving line SDL may be substantially the same as the first pad part PD1, the first data driver IC1, the second pad part PD2, the second data driver IC2, the first scan driver DV1, the second scan driver DV2, the clock line CL, and the scan driving line SDL described with reference to FIG. 1.

According to some embodiments, the first antistatic pattern 31 may be located at a left end of the display device 3000. For example, the clock line CL may be located between the first antistatic pattern 31 and the scan driving line SDL.

The first antistatic pattern 31 may extend in the second direction D2 and may have the second length L2 in the second direction D2. According to some embodiments, the second length L2 may be greater than the first length L1. For example, the first antistatic pattern 31 may extend further in the second direction D2 than the first scan driver DV1.

According to some embodiments, the second antistatic pattern 32 may be located at a right end of the display device 3000. The second antistatic pattern 32 may have substantially the same structure as the first antistatic pattern 31.

Figure 12:
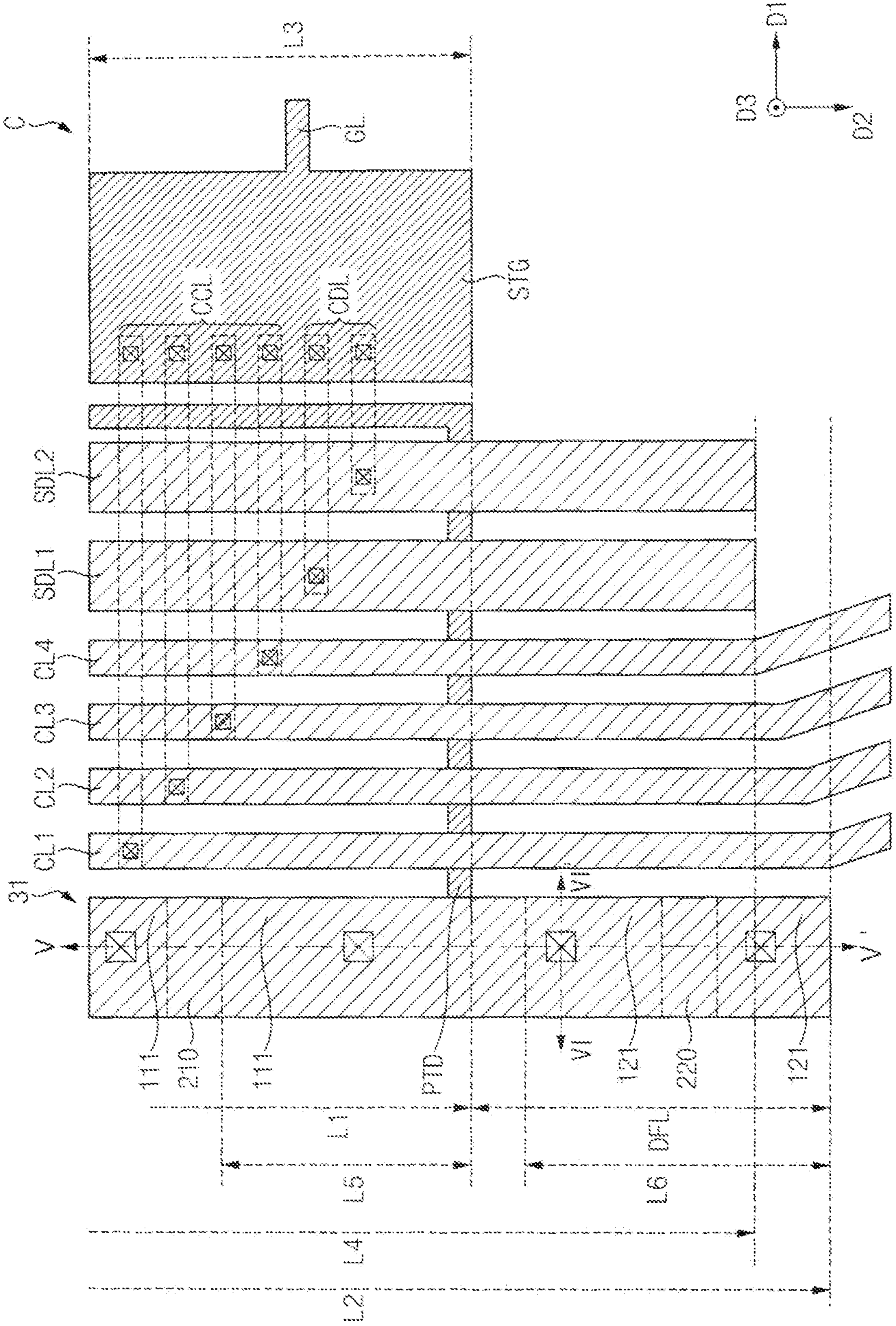
FIG. 12 is an enlarged view of the area C of FIG. 11.
Figure 13:
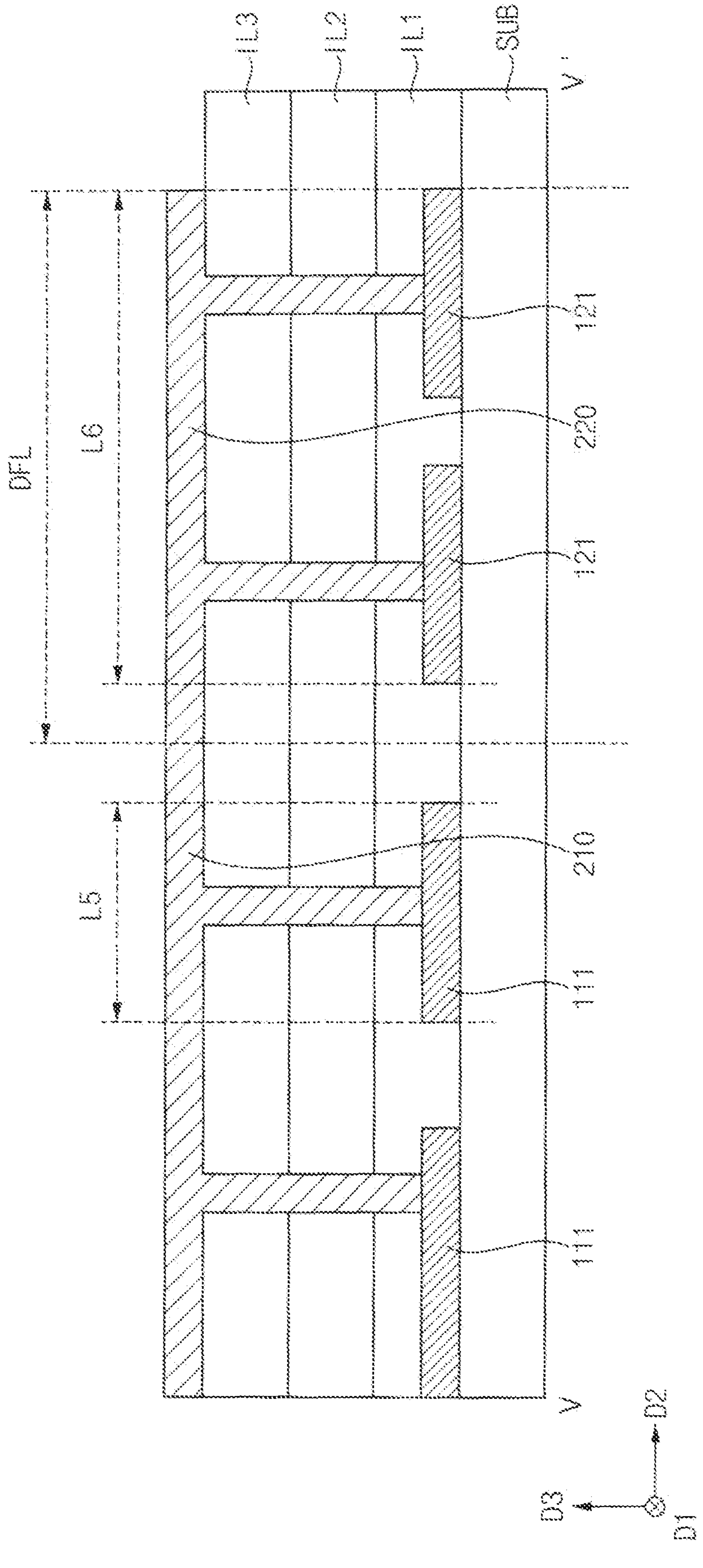
FIG. 13 is a cross-sectional view taken along the line V-V' of FIG. 12.
Figure 14:
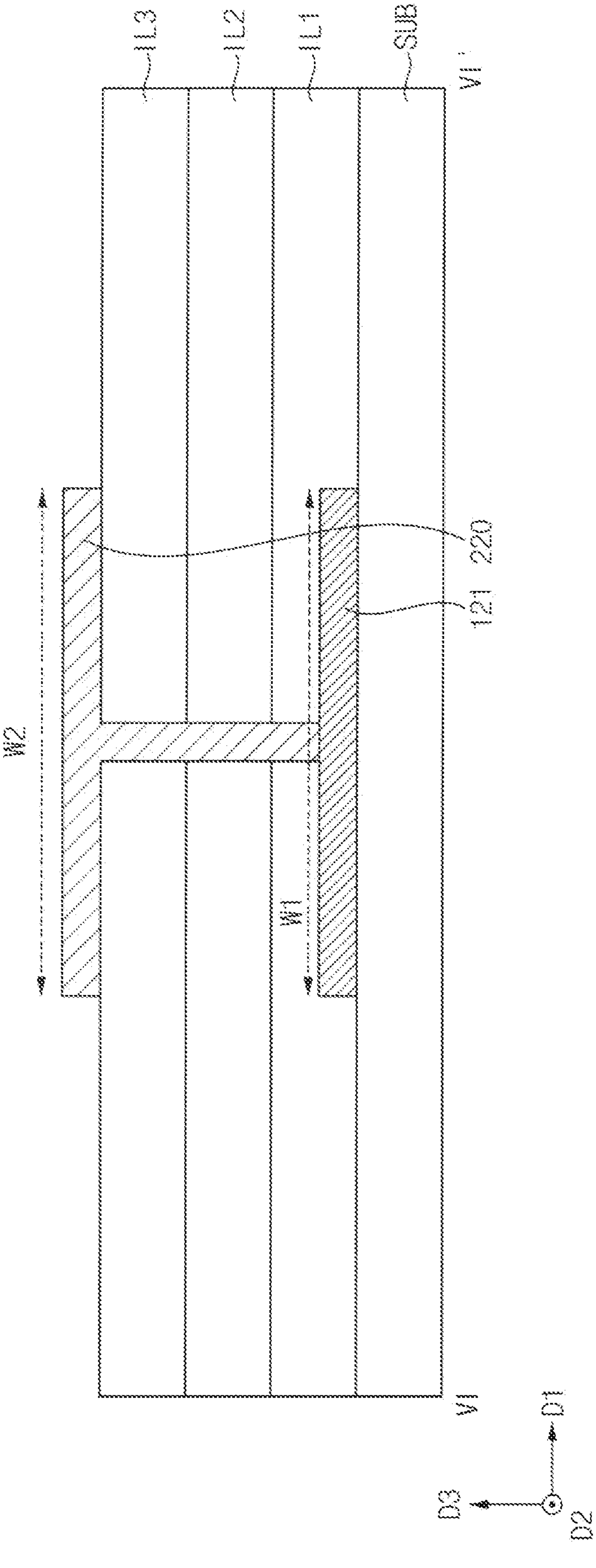
FIG. 14 is a cross-sectional view taken along the line VI-VI' of FIG. 12.

FIG. 12 is an enlarged view of area C of FIG. 11. FIG. 13 is a cross-sectional view taken along line V-V' of FIG. 12. FIG. 14 is a cross-sectional view taken along line VI-VI' of FIG. 12.

Referring to FIGS. 11 and 12, the first antistatic pattern 31 may include a first portion P1, a second portion P2, and a protrusion PTD.

The first portion P1 may extend in the second direction D2 and may overlap the first scan driver DV1 in the first direction D1. The protrusion PTD may protrude from the first portion P1 toward the first scan driver DV1 in the first direction D1. The protrusion PTD may overlap the first scan driver DV1 in the first direction D1.

The second portion P2 may extend from the first portion P1 in the second direction D2. The second portion P2 may not overlap the first scan driver DV1 in the first direction D1.

According to some embodiments, the second length L2 and the first length L1 may be different by the length difference DFL. In other words, the second portion P2 may have a length equal to the length difference DFL in the second direction D2.

According to some embodiments, the length difference DFL may be greater than or equal to the third length L3. For example, a difference between the second length L2 and the first length L1 may be greater than or equal to the third length L3. In other words, the second portion P2 may have a length greater than or equal to the length of the stage STG.

Referring to FIGS. 12, 13, and 14, the first portion P1 may include first lower piece patterns 111 and a first upper pattern 210, and the second portion P2 may include second lower piece patterns 121 and a second upper pattern 220.

According to some embodiments, each of the first lower piece patterns 111 may extend in the second direction D2 and may overlap the first scan driver DV1 in the first direction D1. In addition, the first lower piece patterns 111 may be arranged side by side in the second direction D2. In addition, each of the first lower piece patterns 111 may have the fifth length L5. The fifth length L5 may be smaller than the third length L3 of the stage STG.

The protrusion PTD may protrude from any one of the first lower piece patterns 111 in the first direction D1. The protrusion PTD may be formed together with the first lower piece patterns 111 and may include the same material as the first lower piece patterns 111.

The first upper pattern 210 may extend in the second direction D2 and may overlap the first scan driver DV1 in the first direction D1. As shown in FIG. 13, the first upper pattern 210 may be located on the first lower piece patterns 111 and may contact the first lower piece patterns 111.

According to some embodiments, each of the second lower piece patterns 121 may extend in the second direction D2 and may not overlap the first scan driver DV1. The second lower piece patterns 121 may be formed together with the first lower piece patterns 111 and may include the same material as the first lower piece patterns 111. For example, the second lower piece patterns 121 may include titanium and aluminum.

According to some embodiments, the second lower piece patterns 121 may be separated from the first lower piece patterns 111. In addition, each of the second lower piece patterns 121 may have a sixth length L6 in the second direction D2. The sixth length L6 may be smaller than the third length L3 of the stage STG. In addition, the sixth length L6 may be substantially the same as the fifth length L5.

The second upper pattern 220 may extend in the second direction D2 and may not overlap the first scan driver DV1. In addition, as shown in FIG. 13, the second upper pattern 220 may be located on the second lower piece patterns 121 and may contact the second lower piece patterns 121.

According to some embodiments, the second upper pattern 220 may be connected to the first upper pattern 210 in the second direction D2. For example, the second upper pattern 220 may be integrally formed with the first upper pattern 210. In addition, the second upper pattern 220 may have a length equal to the length difference DFL in the second direction D2.

As shown in FIG. 14, according to some embodiments, a first width W1 of each of the second lower piece patterns 121 in the first direction D1 may be substantially the same as a second width W2 of the second upper pattern 220 in the first direction D1.

The display device 3000 may include the first antistatic pattern 31. The first antistatic pattern 31 may include a plurality of the first lower piece patterns 111 and a plurality of the second lower piece patterns 121. In addition, the first antistatic pattern 31 may include the second portion P2 extending in the second direction D2 so as not to overlap the first scan driver DV1.

As the first lower piece patterns 111 and the second lower piece patterns 121 are separated from each other, static electricity applied to one lower piece pattern may be dispersed. In addition, as the first antistatic pattern 31 includes the protrusion PTD and the second portion P2, static electricity applied to the first antistatic pattern 31 may be dispersed into the protrusion PTD and the second portion P2. Accordingly, static electricity may not be concentrated to the protrusion PTD, and a dielectric breakdown phenomenon occurring in the protrusion PTD may be prevented or reduced.

Although aspects of some embodiments and implementations have been described herein, other embodiments and modifications will be apparent from this description. Accordingly, the inventive concepts are not limited to such embodiments, but rather to the broader scope of the appended claims, and their equivalents, and various modifications and equivalent arrangements as would be apparent to a person of ordinary skill in the art.

What is claimed is:

1. A display device comprising:
- a plurality of gate lines in a display area and extending in a first direction;
- a scan driver in a non-display area surrounding the display area, connecting the gate lines, extending in a second direction crossing the first direction, and having a first length in the second direction; and
- an antistatic pattern in the non-display area, extending in the second direction, and having a second length greater than the first length in the second direction.

2. The display device of claim 1, wherein the scan driver includes a plurality of stages,
- wherein the stages are connected to the gate lines, respectively,
- wherein each of the stages has a third length in the second direction, and
- wherein a difference between the second length and the first length is greater than or equal to the third length.

3. The display device of claim 1, wherein the antistatic pattern includes:
- a first portion overlapping the scan driver in the first direction; and
- a second portion extending from the first portion in the second direction.

4. The display device of claim 3, wherein the second portion does not overlap the scan driver.

5. The display device of claim 3, wherein the antistatic pattern further includes a protrusion protruding from the first portion in the first direction.

6. The display device of claim 5, wherein the protrusion protrudes toward the scan driver.

7. The display device of claim 5, wherein the protrusion overlaps the scan driver in the first direction.

8. The display device of claim 1, wherein the antistatic pattern includes:
- a first lower pattern overlapping the scan driver in the first direction;
- a second lower pattern connected to the first lower pattern in the second direction;
- a first upper pattern on the first lower pattern and contacting the first lower pattern; and
- a second upper pattern connected to the first upper pattern in the second direction, on the second lower pattern, and contacting the second lower pattern.

9. The display device of claim 8, wherein the second lower pattern and the second upper pattern do not overlap the scan driver.

10. The display device of claim 8, wherein a width of the second lower pattern in the first direction is equal to a width of the second upper pattern in the first direction.

11. The display device of claim 8, wherein the second lower pattern includes titanium and aluminum.

12. The display device of claim 1, wherein the antistatic pattern includes:
- a first lower piece pattern overlapping the scan driver in the first direction;
- a second lower piece pattern separated from the first lower piece pattern in the second direction;
- a first upper pattern on the first lower piece pattern and contacting the first lower piece pattern; and
- a second upper pattern connected to the first upper pattern in the first upper pattern, on the second lower piece pattern, and contacting the second lower piece pattern.

13. The display device of claim 12, wherein the second lower piece pattern and the second upper pattern do not overlap the scan driver.

14. The display device of claim 12, wherein a width of the second lower piece pattern in the first direction is equal to a width of the second upper pattern in the first direction.

15. The display device of claim 1, further comprising:

a clock line between the scan driver and the antistatic pattern, connected to the scan driver, and extending in the second direction.

16. The display device of claim 1, further comprising:

a scan driving line between the scan driver and the antistatic pattern, connected to the scan driver, and extending in the second direction.

17. The display device of claim 16, wherein the scan driving line has a fourth length in the second direction, and wherein the fourth length is greater than the first length and smaller than the second length.

18. A display device comprising:

a plurality of gate lines in a display area and extending in a first direction;

a scan driver in a non-display area surrounding the display area, connected to the gate lines, and extending in a second direction crossing the first direction;

a plurality of lower piece patterns in the non-display area, extending in the second direction, and overlapping the scan driver in the first direction; and an upper pattern on the lower piece patterns and contacting the lower piece patterns.

19. The display device of claim 18, wherein the scan driver includes a plurality of stages, wherein the stages are connected to the gate lines, respectively, wherein each of the stages has a third length in the second direction, and wherein a fifth length of each of the lower piece patterns in the second direction is smaller than the third length of each of the stages.

20. The display device of claim 18, wherein a width of each of the lower piece patterns in the first direction is equal to a width of the upper pattern in the first direction.

* * * * *